United States Patent [19]

Bullen

[11] Patent Number: 4,975,480

[45] Date of Patent: Dec. 4, 1990

[54] CROSSLINKABLE SILYL POLYMER COMPOSITION

[75] Inventor: David J. Bullen, Falkirk, Scotland

[73] Assignee: BP Chemicals Limited, London, England

[21] Appl. No.: 481,648

[22] Filed: Feb. 13, 1990

Related U.S. Application Data

[63] Continuation of Ser. No. 173,266, Mar. 25, 1988, abandoned.

[30] Foreign Application Priority Data

Apr. 2, 1987 [GB] United Kingdom ............... 8707890

[51] Int. Cl.$^5$ .................... C08K 5/12; C08L 43/04
[52] U.S. Cl. .................... 524/294; 524/295; 524/296; 524/297; 524/535; 524/547
[58] Field of Search ............... 524/296, 297, 298, 295, 524/294, 535, 547

[56] References Cited

U.S. PATENT DOCUMENTS

| | | | |
|---|---|---|---|
| 3,794,612 | 2/1974 | Plueddemann | 524/296 |
| 3,798,189 | 3/1974 | Simoneau | 524/297 |
| 3,857,825 | 12/1974 | Streck | 524/296 |
| 4,579,913 | 4/1986 | Keogh | 524/547 |
| 4,588,770 | 5/1986 | Würminghausen | 524/588 |
| 4,593,071 | 6/1986 | Keogh | 524/535 |
| 4,672,004 | 6/1987 | Chizat | 524/588 |

Primary Examiner—C. Warren Ivy
Attorney, Agent, or Firm—Brook, Haidt, Haffner & Delahunty

[57] ABSTRACT

A crosslinkable silyl polymer composition which exhibits a reduced tendency to undergo premature crosslinking during the fabrication of articles therefrom comprises a silyl polymer, an aromatic ester and an organometallic silanol condensation catalyst.

12 Claims, No Drawings

CROSSLINKABLE SILYL POLYMER COMPOSITION

This application is a continuation of application Ser. No. 07/173,266, filed Mar. 25, 1988, now abandoned.

The present invention relates to crosslinkable organic polymer compositions. More particularly the present invention is concerned with crosslinkable compositions comprising organic polymers containing hydrolysable silane groups, which polymers can be thermoformed into shaped articles, for example cable insulation or pipe, and subsequently crosslinked by contacting the articles with water or steam in the presence of a so-called "silanol condensation catalyst".

It is known that organic polymers containing hydrolysable silane groups can be crosslinked by the action of water, preferably in the presence of a silanol condensation catalyst. A number of methods are known for producing such crosslinkable organic polymers. One method comprises copolymerising unsaturated organic monomers, for example, ethylenically unsaturated or vinyl monomers, with unsaturated silane compounds containing hydrolysable groups. Examples of this method are described in GB-A-2028831 and GB-A-2039513 which disclose the preparation of crosslinkable copolymers of ethylene and an ethylenically unsaturated silane compound by copolymerising the monomers at relatively high temperatures and pressures in the presence of a radical polymerisation initiator. Another example of this copolymerisation method is described in GB-A-1415194 which discloses the preparation of crosslinkable copolymer by contacting ethylene and a terminally unsaturated silane compound, optionally with other olefinically unsaturated comonomer, with certain defined Ziegler catalysts under polymerisation conditions which preferably employ relatively low temperatures and pressures.

It is also well-known that polymers crosslinkable by the action of water and a silanol condensation catalyst can be prepared by grafting an unsaturated silane compound on to a preformed polymeric material. Grafting processes of this type can be carried out by heating together a base polymer, for example polyethylene, an unsaturated silane compound bearing one or more hydrolysable groups, a grafting initiator and optionally a silanol condensation catalyst, under conditions such that the unsaturated silane compound is grafted on to the base polymer. Examples of this method are disclosed in GB-A-1357549, GB-A-1234034 and GB-A-1286460. Examples of commercial processes which employ a grafting reaction of this type are the SIOPLAS and the MONOSIL processes. (SIOPLAS and MONOSIL are registered trade marks). In the SIOPLAS process, the base polymer is heated with the unsaturated silane in the presence of a grafting initiator and the product is extruded and pelleted to produce a pelleted silane-grafted thermoplastic polymer. The pelleted polymer can then be fed with a silanol condensation catalyst to a thermoforming process for fabricating shaped products. These shaped products are then crosslinked by exposure to water or steam. In the MONOSIL process, the base polymer, the unsaturated silane, the grafting catalyst and the silanol condensation catalyst are fed simultaneously to a special extruder in which grafting occurs "in situ" and crosslinkable products, e.g. cable or pipe, are directly extruded. These products can be crosslinked by exposure to steam or water under the influence of the silanol condensation catalyst.

Other known methods for forming polymeric materials having hydrolysable silane groups include "transesterification" methods wherein a copolymer having exchangeable functions such as alkoxy groups (as, for example, in ethylene/ethyl acrylate copolymer) or carboxylate groups (as, for example, in ethylene/vinyl acetate copolymer) is treated with a suitable silane compound in the presence of a special ester-exchange catalyst.

In this method, for example, the alkoxy groups present in an ethylene/alkyl(meth)acrylate copolymer can be "ester exchanged" or replaced by a silane substituent bearing hydrolysable groups by reacting the copolymer with a suitable silane compound in the presence of a catalyst (for example, titanium tetraisopropylate). Examples of suitable silane compounds are acetoxy propyl trimethoxy silane, acetoxy propyl triethoxy silane, methacryloxypropyl trimethoxy silane, acryloxypropyl trimethoxy silane, methacryloxypropyl triethoxysilane and acryloxypropyl triethoxy silane. In another example of the transesterification method ethylene/vinyl acetate copolymer can be reacted with a suitable silane compound bearing hydrolysable groups and having esterified carboxylic acid groups which exchange with the acetate groups on the copolymer. A suitable silane compound is 4-[tri(m)ethoxysilyl] butanoic acid (m)ethyl ester.

Crosslinkable organic polymers having hydrolysable silane groups (hereinafter referred to as "silyl polymers") can be fabricated to form a large variety of useful articles by conventional techniques, for example, extrusion, injection moulding, blow-moulding and film-blowing processes. The crosslinking step is generally carried out subsequent to fabrication of the article because the crosslinked polymer cannot in general be satisfactorily thermoformed.

A problem encountered with silyl polymers is that during thermoforming operations the polymer can undergo premature crosslinking which can lead to difficulties in the fabrication of articles from the polymer or to the production of articles having unsatisfactory physical and mechanical properties. The problem is particularly serious in the production of extruded wire and cable insulation wherein it is important to provide an extruded layer of insulation free from surface roughness. Wire or cable insulation which has a relatively rough surface can suffer mechanical damage (for example, tearing and snagging) leading to insulation failure. The roughness can also lead to electrical stress and insulation breakdown in higher voltage applications.

One method of reducing premature crosslinking proposed in GB-A-1357549 is to mould or extrude articles from silyl polymers in the absence of the silanol condensation catalyst and then to contact the produced article with an aqueous dispersion or solution of a tin carboxylate to cause the crosslinking. However, in many applications it is preferred to include the silanol condensation catalyst as a component of the polymer composition as this leads in general to higher crosslinking rates and to more complete crosslinking particularly in articles having thick cross section.

It is an object of the present invention to provide a crosslinkable silyl polymer composition which exhibits a reduced tendency to undergo premature crosslinking during the fabrication of articles therefrom.

Accordingly, one aspect of the present invention provides a composition capable of being crosslinked by the action of water comprising
(A) a silyl polymer,
(B) an aromatic ester and
(C) an organometallic silanol condensation catalyst.

The silyl polymer employed in the composition of the present invention is suitably any organic polymer containing hydrolysable silane groups which is crosslinkable by the action of water in the presence of a silanol condensation catalyst. Preferably the silyl polymer is an ethylene polymer containing hydrolysable silane groups. Such ethylene polymers can comprise up to 30% by weight of monomer units other than silane units. Preferably however, the ethylene polymer comprises less than 10% by weight of such other monomers. Most preferably, the silyl polymer is a copolymer of ethylene units and silane units only. Examples of suitable silyl polymers and references to their methods of manufacture are described above. Preferred silyl polymers are those prepared by copolymerising ethylene and an unsaturated silane compound having one or more hydrolysable groups preferably in the presence of a free radical initiator and optionally together with one or more other monomers copolymerisable therewith, or those prepared by graft copolymerising an unsaturated silane on to a base polymer in the presence of a grafting initiator. Particularly preferred silyl polymers are those prepared by copolymerising ethylene and an unsaturated silane compound having one or more hydrolysable groups, optionally together with one or more other unsaturated compounds, at a temperature of 150° to 400° C. and a pressure of 1000 to 4000 bar in the presence of a free radical polymerisation initiator.

The unsaturated silane compound employed in such processes is preferably a compound having the general formula $XSiX^1_nY_{3-n}$ wherein X represents an ethylenically unsaturated hydrocarbyl or hydrocarbyloxy group; $X^1$ represents an aliphatic saturated hydrocarbyl group; Y represents a hydrolysable organic group; and n represents zero, 1 or 2. X can be, for example, vinyl, allyl, isopropenyl, butenyl, cyclohexenyl or gamma-methacryloxypropyl. Y can be, for example, methoxy, ethoxy, formyloxy, acetoxy, propionyloxy, alkylamino or arylamino. $X^1$ can be, for example, methyl, ethyl, propyl, hexyl, octyl, decyl or phenyl. X is preferably a vinyl group, Y is preferably methoxy, ethoxy or acetoxy. Preferred unsaturated silane compounds are vinyl trimethoxy silane, vinyl triethoxy silane and vinyl triacetoxy silane.

The silyl polymer suitably contains 0.1–10 weight %, preferably 0.5 to 5 weight %, more preferably 0.7 to 2 weight % of copolymerised or grafted units of the unsaturated silane compound (based on silyl polymer).

The aromatic ester employed in the present invention is preferably one or more selected from hydrocarbyl esters, for example, alkyl, aralkyl or alkaryl esters of aromatic carboxylic acids. Suitable aromatic carboxylic acids include for example mono-, di- and tricarboxylic acids. Esters of di- and tricarboxylic aromatic acids are preferred. Examples of aromatic acids present as the acid function in the esters are phthalic acid (benzene-1,2 dicarboxylic acid), isophthalic acid (benzene-1,3-dicarboxylic acid), terephthalic acid (benzene-1,4-dicarboxylic acid) and trimellitic acid (benzene-1,2,4-tricarboxylic acid). The hydrocarbyl function of the hydrocarbyl ester is preferably an alkyl, alkaryl, aralkyl or aryl group containing 1 to 30, preferably 4 to 16 carbon atoms. When the hydrocarbyl function is an alkyl group, it can be linear or branched. Examples of suitable hydrocarbyl groups are alkyl groups such as for example methyl, ethyl, n-propyl, isopropyl, n-butyl, tert-butyl, n-aryl, n-hexyl, n-octyl, 2-ethyl-hexyl, n-decyl, lauryl, stearyl, palmityl, oleyl, ceryl and myricyl groups, mixed alkyl-aryl groups, for example ethylphenyl, benzyl and tolyl, and aromatic groups, for example phenyl and naphthyl groups. When the aromatic ester has more than one hydrocarbyl function, they can be the same or different. For example, the aromatic ester can be produced by reacting together a di- or tri-carboxylic acid, e.g. phthalic acid, and a mixture of aliphatic alcohols, e.g. $C_4$, $C_6$ and $C_8$ alcohols. Examples of suitable esters are di-n-butylphthalate, dioctylphthalate, di(2-ethyl-hexyl) phthalate, dibenzylphthalate, distearylphthalate, trioctyltrimellitate and tri (2-ethylhexyl) trimellitate. Di(2-ethyl-hexyl)phthalate and tri-(2-ethyl-hexyl)trimellitate are preferred. The aromatic ester preferably has a boiling point at 500 Pa pressure of at least 200° C. more preferably at least 220° C. Preferably it is a liquid at or below 20° C. The viscosity of the aromatic ester is preferably less than 300 mPa.s at 20° C. and less than 15 mPa.s at 100° C. The molar ratio of the quantities of aromatic ester to silanol condensation catalyst is suitably in the range 10:1 to 1:3, preferably in the range 6:1 to 1:2, more preferably 6:1 to 3:1. Particular combinations of the aromatic ester with other components which form useful "precursors" to the composition of the present invention can comprise, for example;

1. A blend of the ester with a silanol condensation catalyst.
2. A blend of the ester with a hydrolysable unsaturated silane compound, a peroxide grafting initiator and a silanol condensation catalyst.
3. A masterbatch comprising the aromatic ester, the silanol condensation catalyst and a suitable polymeric carrier, for example low density polyethylene. Such masterbatch may optionally contain other ingredients, for example antioxidant or process stabilisers and the like.

The precursor (1) can be used for example for the direct introduction of the ester and silanol condensation catalyst into an ethylene/unsaturated silane copolymer or into a graft polymer of polyethylene with an unsaturated silane during melt processing. The precursor (2) can be used, for example, for the direct production of crosslinkable articles based on graft polymer of polyethylene/unsaturated silane using for example extrusion apparatus of the type described in GB-A-1526398 (BICC Limited and Etablissements Maillefer SA).

Any of the organometallic silanol condensation catalysts known in the art for crosslinking silyl polymers can be suitably employed in the present invention. They can be used in the quantities conventionally employed. Examples of suitable classes of organometallic silanol condensation catalysts are, for example complexes or carboxylates of lead, cobalt, iron, nickel, zinc and tin. Specific examples of the silanol condensation catalyst are dibutyl tin dilaurate, dibutyl tin diacetate, dibutyl tin dioctoate, stannous acetate, stannous caprylate, lead naphthenate, zinc caprylate, cobalt naphthenate; carboxylates of tin are preferred. Particularly preferred silanol condensation catalysts are dialkyl tin carboxylates, for example dibutyl tin dilaurate, dibutyl tin dipalmitate, dibutyl tin distearate, dioctyl tin dilaurate and dibutyl tin maleate.

The quantity of silanol condensation catalyst employed in the crosslinkable composition of the present invention is suitably in the range 0.0001 to 0.5 moles, preferably in the range 0.0005 to 0.05 moles per mole of hydrolysable silyl units in the silyl polymer.

Generally speaking, the quantity of the silanol condensation catalyst is in the range from 0.01 to 5% by weight, most preferably 0.03 to 0.2% by weight, relative to the quantity of silyl polymer in the composition.

The composition of the present invention comprising the silyl polymer, the aromatic ester and the silanol condensation catalyst and/or any other ingredients of the composition, can be prepared by a variety of techniques including, for example, direct blending or compounding of the ingredients, the use of masterbatch techniques or by forming the silyl polymer by grafting techniques "in situ" in the presence of the aromatic ester or by direct injection of a mixture comprising the aromatic ester and the silanol condensation catalyst into the silyl polymer melt.

The composition can be prepared for example by contacting the silyl polymer in granular form (e.g. powder or pellets) with the aromatic ester and organometallic silanol condensation catalyst under conditions such that the aromatic ester and silanol condensation catalyst are absorbed by the polymer granules. If desired, other additives, for example antioxidant can be absorbed into the polymer using the same type of "soaking" technique. Thus, if desired, the granular polymer can be tumbled with a mixture of aromatic ester, silanol condensation catalyst and antioxidant until absorption of the ingredients is substantially complete. The rate of absorption can be increased by the use of elevated temperatures and/or intensive mixing if desired. Optionally, an absorbent filler such as, for example, chalk, silica or talc, can be employed to assist absorption of the catalyst and aromatic ester into the composition.

In a further method of making the composition of the present invention, the aromatic ester and the silanol condensation catalyst and optionally any other ingredients which it is desired to incorporate in the composition, can be included in a masterbatch, components which react together to form the silyl polymer "in situ".

In the case that the silyl polymer is prepared by grafting the unsaturated silane on to a base polymer, for example low density polyethylene, linear low density polyethylene, ethylene/ethyl acrylate copolymer or ethylene/vinyl acetate copolymer, the aromatic ester and the silanol condensation catalyst can for example be incorporated into the base polymer prior to or during the performance of the grafting reaction.

A crosslinkable composition according to the present invention comprising the silyl polymer, the aromatic ester, the silanol condensation catalyst and, optionally other ingredients, can for example be prepared directly in the form of crosslinkable finished articles by extruding a base polymer, e.g. polyethylene, together with the aromatic ester, an unsaturated silane compound of the type described earlier in this specification, a free radical catalyst, i.e. initiator for grafting (e.g. an organic peroxide) and a silanol condensation catalyst. This method can be applied for example in the well-known MONOSIL (TM) process for the production of insulated wire and cable.

The composition of the present invention can contain additives conventionally employed in the art. Examples of such additives are antioxidants, fillers, metal deactivators (e.g. salicylaldehyde oxime or a hydrazine), lubricants, water-tree inhibitors, foaming agents, flame retardants and pigments. Additives of this type are conventionally incorporated into the composition either directly or by a masterbatching technique.

The composition can also be blended with other compatible polymeric materials, for example, polyethylene, polypropylene, ethylene/ethyl acrylate copolymer and ethylene/1-olefin copolymer (e.g. LLDPE).

The composition of the present invention can be used to manufacture crosslinked products using the technology known in the manufacture of articles from conventional silyl polymers. For example, the composition can be used in blow-moulding, injection-moulding, film-blowing, calendering, extrusion, roto-moulding and extrusion-coating techniques. The composition is particularly preferred for wire and cable coating applications. Wire and cable insulation produced by extrusion coating using the composition of the present invention exhibits improved surface finish.

Articles fabricated from the composition of the present invention can be readily crosslinked by exposure to water in the form of liquid, steam or moist air, The invention is further illustrated by the following Examples and Comparative Tests.

EXAMPLE 1 AND COMPARATIVE TEST A

Compositions were prepared from the ingredients listed in Table 1. The silane copolymer was a copolymer of ethylene and vinyl trimethoxy silane containing 1.5 weight % of copolymerised units of the vinyl trimethoxy silane. The silane copolymer starting material in the form of pellets were tumbled with the other ingredients with the exclusion of moisture for about ¼ hour prior to feeding the mixture to a wire extrusion coating line (Francis Shaw Wire Coating Line) for coating a 0.7 mm diameter copper conductor with a 1 mm thick layer of the composition. The extrusion temperature profile was such that the melt temperature of the polymer on exit from the die was about 195° C. 100 m lengths of extrudate of Example 1 and Comparative Test A were subjected to a tactile assessment of the number of surface gels. It can be seen from Table 1 that the use of dioctyl phthalate provided a significant reduction in undesirable surface gels in the coated insulation.

TABLE 1

| Component | Parts by Weight | |
|---|---|---|
| | Example 1 | Comparative Test A |
| Silane Copolymer | 99.6 | 99.9 |
| DBTDL | 0.1 | 0.1 |
| DOP | 0.3 | None |
| Gels per 100 meters | 12 | above 500 |

EXAMPLE 2 AND COMPARATIVE TEST B

Compositions were prepared as in Example 1 using the ingredients listed in Table 2. Rod extrusions were performed on a laboratory extruder (Brabender). The temperature of the polymer at the die exit was 225° C.

TABLE 2

| Component | Parts by Weight | |
|---|---|---|
| | Example 2 | Comparative Test B |
| Silane Copolymer | 99.6 | 99.9 |

TABLE 2-continued

| Component | Parts by Weight | |
| --- | --- | --- |
| | Example 2 | Comparative Test B |
| DBTDL | 0.1 | 0.1 |
| TOT | 0.3 | None |
| Gels per 5 meters | Less than 1 | Greater than 200 |

EXAMPLES 3 TO 10 AND COMPARATIVE TESTS C, D AND E

Dibutyl tin dilaurate and dioctylphthalate were mixed together in different amounts to provide a series of mixtures with different molar ratios. The moisture content of each mixture was determined using a Mitsubishi CA-02 moisture meter. The mixtures were then sealed in air-tight vials to prevent further absorption of atmospheric water.

The mixtures were added to 100 g samples of the same silane copolymer as used in Example 1 in sufficient quantity that each of the crosslinkable silyl polymer compositions contained 0.1 parts by weight of the silanol condensation catalyst per one hundred parts by weight of the silane copolymer. Each of the crosslinkable compositions was thoroughly mixed in a stoppered flask using a Microid flask shaker and was then extruded using an 18:1, 1.0 inch (25.4 mm) Brabender extruder fitted with a standard 3:1 compression ratio "polyethylene" screw and 0.25 inch (1.016 mm) rod die. The barrel temperatures of the extruder were set to 140° C., 160° C. and 180° C. from hopper to die. The die itself was maintained at 220° C. The screw speed was 30 rpm, giving a residence time of approximately 3.5 minutes. The extrudate was rapidly cooled by having cold air blown over it. A haul off unit was used to maintain a substantially constant diameter rod extrudate. Between each crosslinkable silyl polymer composition, the extruder was flushed with an additive-free low density polyethylene until no gels were observed in the extrudate. The low density polyethylene had a melt flow index of 0.9 dg/min and a density of 926 kg/m³.

The extrusion conditions were selected to accentuate the effect of precuring so that the beneficial effect of the aromatic ester could be more readily appreciated. Forty-eight hours after extruding the crosslinkable silyl polymer compositions, samples were analysed for gel content. The gel content was determined using a test method based on ASTM D 2765 using xylene mixed isomers with a boiling point of 140° C. This provided a measure of the amount of crosslinking which had occurred both during the extrusion and the following 48 hours; as such it can be taken as an indication of the tendency of the composition to undergo curing under ambient conditions, i.e. atmospheric pressure, approximately 20° C. and a relative humidity from 60 to 75%. On the basis of a tactile assessment of the surface of the extrudate of each crosslinkable composition, a representative sample having average roughness was chosen and subjected to a measurement of the surface roughness using a Takysurf 4 measuring device sold by Rank Taylor Hobson (Talysurf is a trade mark). The design of the Talysurf 4 is based on well tried and proved principles and conforms to British Standard 1134:1961. The Talysurf instrument makes use of a sharply pointed stylus to trace the profile of surface irregularities. A flat shoe ar skid provides a datum. The pick-up carrying the stylus and shoe or skid was traversed across the surface of the extrudate for a horizontal distance of 90 mm. Using a transducer the up and down movements of the stylus relative to the shoe or skid were converted into corresponding changes in electric voltage which were amplified and used to control a graph recorder which provided a graphical representation of the profile of the surface of the extrudate. A computer was used to calculate the surface roughness value which is the length of the graphical representation of the profile, in microns, divided by the horizontal length, in millimeters, of the surface traversed by the stylus, i.e. 90 mm.

The surface roughness value for each of the extruded crosslinkable silyl polymer compositions is given in Table 3. For comparison the results are also given for the silane copolymer alone (Comparative Test C) and for the silane copolymer with 0.1% by weight of dibutyl tin dilaurate but without aromatic ester (Comparative Tests D and E).

The Comparative Tests C, D and E clearly demonstrate the effect of the silanol condensation catalyst on the surface roughness of the extrudate. Examples 3 to 9 show that this surface roughness can be considerably reduced by the inclusion of dioctylphthalate. The best result was achieved with a ratio of dibutyl tin dilaurate to aromatic ester of 1:4. The gel content after 48 hours was not significantly affected by the presence of the dioctylphthalate. The dibutyl tin dilaurate used in Comparative Test D and Examples 3 to 9 had a relatively high water content, i.e. 4700 ppm. Comparative Test E and Example 10 used dibutyl tin dilaurate with a lower water content, i.e. 1000 ppm. Example 10 still shows a reduction in surface roughness as compared with Comparative Test E. The gel contents after 48 hours of Example 10 and the Comparative Test E were not substantially different from those of Examples 3 to 10 and Comparative Test D.

TABLE 3

| Example or Comparative Test | Molar Ratio of Dibutyl Tin Dilaurate to Aromatic Ester | Moisture Content of Mixture of Dibutyl Tin Dilaurate and Aromatic Ester (ppm) | Gel Content after 48 hours % | Surface Roughness |
| --- | --- | --- | --- | --- |
| C | — | — | 0.2 | 9.26 |
| D | — | 4700 | 37.7 | 71.95 |
| 3 | 1:1 | 2900 | 38.4 | 51.84 |
| 4 | 1:2 | 2200 | 38.3 | 46.67 |
| 5 | 1:3 | 2100 | 39.5 | 35.72 |
| 6 | 1:4 | 1600 | 44.2 | 20.87 |
| 8 | 1:6 | 1300 | 42.2 | 38.14 |
| 9 | 1:8 | — | 41.9 | 32.70 |
| E | — | 1000 | 44.2 | 45.14 |
| 10 | 1:4 | 600 | 40.3 | 30.36 |

EXAMPLES 11 TO 16

Further crosslinkable silyl polymer compositions were prepared, extruded and tested as described for Examples 3 to 10 except that the aromatic ester used was either (A) trioctyl trimellitate or (B) a stabilised trimellitate of n-octanol and n-decanol.

The surface roughness values of the extruded compositions are given in Table 4. As for dioctylphthalate, the optimum molar ratio of dibutyl tin dilaurate to aromatic ester was 1:4.

TABLE 4

| Example | Aromatic Ester | Molar Ratio of Dibutyl Tin Dilaurate to Aromatic Ester | Moisture Content of Mixture of Dibutyl Tin Dilaurate and Aromatic Ester (ppm) | Gel Content after 48 hrs. (%) | Surface Roughness |
|---|---|---|---|---|---|
| 11 | TOT[1] | 1:2 | 900 | 35.5 | 47.25 |
| 12 | TOT | 1:4 | 700 | 33.0 | 17.15 |
| 13 | TOT | 1:6 | 600 | 26.6 | 54.59 |
| 14 | T810T[2] | 1:2 | 700 | 28.2 | 48.35 |
| 15 | T810T | 1:4 | 600 | 0.7 | 63.31[3] |
| 16 | T810T | 1:6 | 500 | 10.3 | 22.37 |

[1]TOT is trioctyltrimellitate
[2]T810T is a stabilized trimellitate of n-octanol and n-decanol which has a vicosity of 126 mPa.s and at 100° C. of 8.0 mPa.s and a boiling point at 20 Pa of 248° C.
[3]Subsequent samples of this composition all had surface roughness values in the range from 20.27 to 32.76.

I claim:

1. A composition capable of being crosslinked by the action of water comprising (A) a silyl polymer prepared by copolymerizing ethylene and an unsaturated silane compound containing hydrolysable groups, (B) an aromatic ester comprising a hydrocarbyl ester of an aromatic carboxylic acid, and (C) an organometallic silanol condensation catalyst.

2. A composition as claimed in claim 1 in which the aromatic ester is a hydrocarbyl ester of a mono-, di- or tri-carboxylic acid.

3. A composition as claimed in claim 2 in which the aromatic ester is a hydrocarbyl ester of a carboxylic acid selected from the group consisting of phthalic acid, isophthalic acid, terephthalic acid and trimellitic acid.

4. A composition as claimed in claim 2 in which each hydrocarbyl function of the hydrocarbyl ester of a mono-, di- or tricarboxylic acid is an alkyl, alkaryl, aralkyl or aryl group having from 1 to 30 carbon atoms.

5. A composition as claimed in claim 4 in which each hydrocarbyl function of the ester has from 4 to 16 carbon atoms.

6. A composition as claimed in claim 1 in which the aromatic ester has a boiling point at a pressure of 500 Pa of at least 200° C.

7. A composition as claimed in claim 1 in which the aromatic ester has a viscosity of less than 300 mPa.s at 20° C. and of less than 15 mPa.s at 100° C.

8. A composition as claimed in claim 1 in which the aromatic ester is selected from the group consisting of di-n-butylphthalate, di-n-octylphthalate, dibenzylphthalate, distearylphthalate and tri-n-octyltrimellitate.

9. A composition as claimed in claim 1 in which the aromatic ester is di(2-ethyl-hexyl)phthalate or di(2-ethyl-hexyl)trimellitate.

10. A composition as claimed in claim 1 in which the molar ratio of the quantities of aromatic ester to silanol condensation catalyst is in the range 6:1 to 1:2.

11. A composition as claimed in claim 1 in which the unsaturated silane compound having hydrolysable groups has the general formula:

$$XSiX^1{}_nY_{3-n}$$

wherein X represents an ethylenically unsaturated hydrocarbyl or hydrocarbyloxyl group; $X^1$ represents an aliphatic saturated hydrocarbyl group; Y represents a hydrolysable organic group and n represents 0, 1 or 2.

12. A composition as claimed in claim 11 in which the unsaturated silane compound is selected from the group consisting of vinyl trimethoxy silane, vinyl triethoxy silane and vinyl triacetoxy silane.

* * * * *

UNITED STATES PATENT AND TRADEMARK OFFICE
CERTIFICATE OF CORRECTION

PATENT NO. : 4,975,480

DATED : December 4, 1990

INVENTOR(S) : DAVID J. BULLEN

It is certified that error appears in the above-identified patent and that said Letters Patent is hereby corrected as shown below:

Col. 7, l. 8, "Example 2 and Comparative Test B" has been omitted.

Col. 6, l. 56, insert the following:

Notes on the Table

DBTDL is dibutyl tin dilaurate (used as the silanol condensation catalyst). DOP is dioctylphthalate sold under the trade name Bisoflex DOP by BP Chemicals Ltd (Bisoflex is a trade mark). DOP has a viscosity of 20°C of 78 mPa.s and at 100°C of 3.8 mPa.s and a boiling point at 500 Pa of 220°C.

UNITED STATES PATENT AND TRADEMARK OFFICE
CERTIFICATE OF CORRECTION

PATENT NO. : 4,975,480

DATED : December 4, 1990

INVENTOR(S) : DAVID J. BULLEN

It is certified that error appears in the above-identified patent and that said Letters Patent is hereby corrected as shown below:

Col. 7, line 8, insert the following:

<u>Notes on the Table 2</u>

TOT is trioctyltrimellitate sold under the trade name BISOFLEX TOT by BP Chemicals Ltd. (Bisoflex is a trade mark). TOT has viscosity at 20°C of 300 mPa.s and at 100°C of 9.8 mPa.s and a boiling point of 20Pa of 221°C.

Signed and Sealed this

Twenty-eighth Day of July, 1992

*Attest:*

DOUGLAS B. COMER

*Attesting Officer*     *Acting Commissioner of Patents and Trademarks*